United States Patent

[11] 3,596,261

[72] Inventor Anthony J. Perneski
Martinsville, N.J.

[21] Appl. No. 877,087
[22] Filed Nov. 17, 1969
[45] Patented July 27, 1971
[73] Assignee Bell Telephone Laboratories, Incorporated
Murray Hill, Berkeley Heights, N.J.

[54] SINGLE WALL DOMAIN SWITCHING ARRANGEMENT
7 Claims, 23 Drawing Figs.

[52] U.S. Cl. ..... 340/174 TF, 340/174 SR, 340/174 YC
[51] Int. Cl. ..... G11c 11/14, G11c 11/42, G11c 21/00
[50] Field of Search ..... 340/174 TF, 174 SR

[56] References Cited
UNITED STATES PATENTS
3,506,975 4/1970 Bobeck et al. ..... 340/174

*Primary Examiner*—James W. Moffitt
*Attorneys*—R. J. Guenther and Kenneth B. Hamlin

ABSTRACT: A single wall domain propagation arrangement wherein magnetically soft overlays define propagation channels in a sheet of magnetic material in response to a reorienting in-plane field is adapted herein for providing a "coincident-domain" memory. The overlay at each bit location of the memory is structured to serve the function of a latching switch. A domain pattern advanced along one of coordinate domain propagation accessing channels is rerouted to the coordinate channel when the associated switch is closed.

INVENTOR
A. J. PERNESKI
BY Herbert M. Shapiro
ATTORNEY

SINGLE WALL DOMAIN SWITCHING ARRANGEMENT

FIELD OF THE INVENTION

This invention relates to data processing arrangements and, more particularly, to such arrangements in which single wall domains are moved through a magnetic material.

BACKGROUND OF THE INVENTION

Domain propagation devices are well known in the art. In one type of domain propagation device, magnetic domains which are self-bounded by a single domain wall are formed in a body of magnetic material. These domains are stable localized entities which are free to move in a plane of movement in the material. Typically, the body of material is in the form of a thin sheet or slice of crystalline material such as a rare earth orthoferrite. A single wall domain in such a material has the geometry of a cylinder with the faces of the cylinder coincident with the surfaces of the slice, the periphery of the cylinder being defined by a single domain wall. The domain appears as a disc when observed through an analyzer with polarized light using either the Kerr or Faraday effect. The Bell System Technical Journal (BSTJ), Vol. XLVI, No. 8, Oct. 1967, at page 1901 et seq., describes such domains and their movement in representative materials.

One technique for moving single wall domains employs conductor loops in consecutively offset positions on the surface of the material in which domains are to be moved. The conductors are pulsed in sequence to generate consecutively offset magnetic fields (viz., field gradients) to attract domains. Since the domains are stable in uniform material in the absence of artificial constraints, offset fields are free to move a domain anywhere in the plane of the slice. The conductors are typically connected serially in three sets to provide a familiar three-phase shift register operation with a reduced number of external connections.

Another technique for moving single wall domains permits external connections to be eliminated altogether. This technique employs a magnetically soft material deposited on a substrate and juxtaposed with a surface of the material in which the domains are moved. Alternatively, the pattern may be appliqued directly to the surface of the material. Exchange coupling is conveniently avoided in this instance for example, by a spacing layer of chromium about 200 Angstrom units thick. A typical overlay comprises bar and T-shaped repetitive patterns arranged to form a path between input and output positions. A magnetic field in the plane of the overlay induces magnetic poles in the overlay elements aligned with the field. The poles move when the in-plane field reorients thus generating a pole pattern which changes to attract the domains to different positions. The path along which domains are moved is determined by the geometry of the overlay and the consecutive orientations of the in-plane field. Although this technique has the virtue of requiring no external connections, all domains in the material are moved simultaneously and selective movement of a particular domain is difficult.

There are a variety of other types of propagating circuits also. "Hybrid" circuits for example employ both types of propagation techniques together. These circuits take advantage of a trade-off between reduced numbers of external connections and some selectivity in the manipulation of domains. On the other hand, it is possible to configure the overlay geometry to provide prescribed areas in the material in which domains move in a manner different from the movement of domains in other areas all in response to the same reorienting in-plane fields. A degree of selectivity is achieved in this manner still in the absence of external connections.

An object of this invention is to provide a new and improved domain propagation device including an overlay configuration in which selectivity in domain movement is realized in selected areas of a material in which domains are moved in the absence of external connections.

BRIEF DESCRIPTION OF THE INVENTION

In accordance with this invention, a domain "shuttle" propagation path in a slice of magnetic material is defined by a magnetically soft overlay between first and second spaced apart alternative positions at which domains are recirculated in response to a reorienting in-plane field. Each bit location in memory is organized in this form. A domain is stored permanently in one of each pair of recirculating positions. Access propagation channels oriented in an X–Y matrix intersect at the first and second recirculating positions at each bit location. In response to the simultaneous movement of a domain along each of a pair of access channels, a recirculating domain is dislodged from the associated recirculating position and moved to its alternate position. The resulting organization serves as a "coincident-domain" memory when organized in an array. In addition, the fact that single wall domains repel one another is used to deflect information-representing domain patterns from say an X channel to a Y channel intersected thereby at a recirculating position occupied by a domain. The latter embodiment provides a switching matrix for use, for example, in a telephone central office as a telephone interconnection matrix.

DETAILED DESCRIPTION

Figure 1:
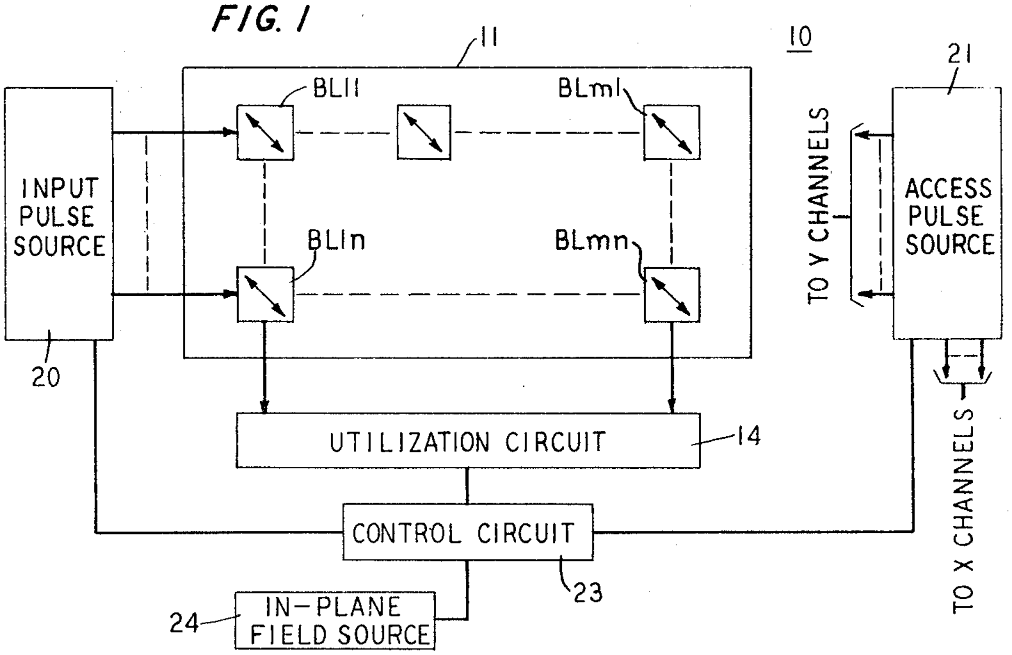
FIG. 1 is a schematic illustration of a memory arrangement in accordance with this invention.

FIG. 1 shows an arrangement 10 in accordance with this invention. The arrangement includes a sheet or slice 11 of a material in which single wall domains can be moved. An overlay pattern, represented by blocks (bit locations) BL11...BL*mn* with double-headed arrows therein, defines an array of domain recirculating positions and related interconnecting shuttle propagation paths for single wall domains. It will become clear that a single wall domain is stored permanently in each bit location to be moved from one recirculating position to another depending on the simultaneous movement of domains along both associated accessing channels.

Figure 2:
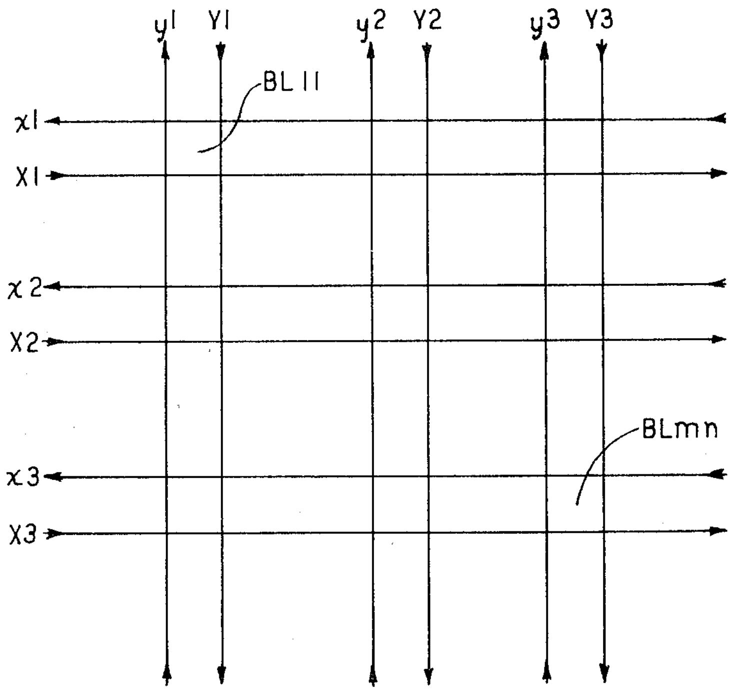
FIG. 2 is a schematic line diagram of the accessing arrangement of the memory of FIG. 1.

FIG. 2 is a line diagram of the intersecting channels for propagating single wall domains. Horizontal channels are designated *x*1, X1, *x*2, X2, *x*3, X3; the vertical channels are designated *y*1, Y1, *y*2, Y2 *y*3, Y3. The intersections between lower case coordinate pairs and between upper case coordinate pairs are pertinent in the illustrative embodiment because each bit location of FIG. 1 has an overlay configured such that a recirculating position is defined to move a domain stored in it to interact with domains advanced through those intersections. In this connection, the term "intersection" will be seen to designate the general area at which coordinate channels come together rather than a physical intersection and actually comprises a set of four positions between which a domain is recirculated as an in-plane field rotates.

Figure 3:
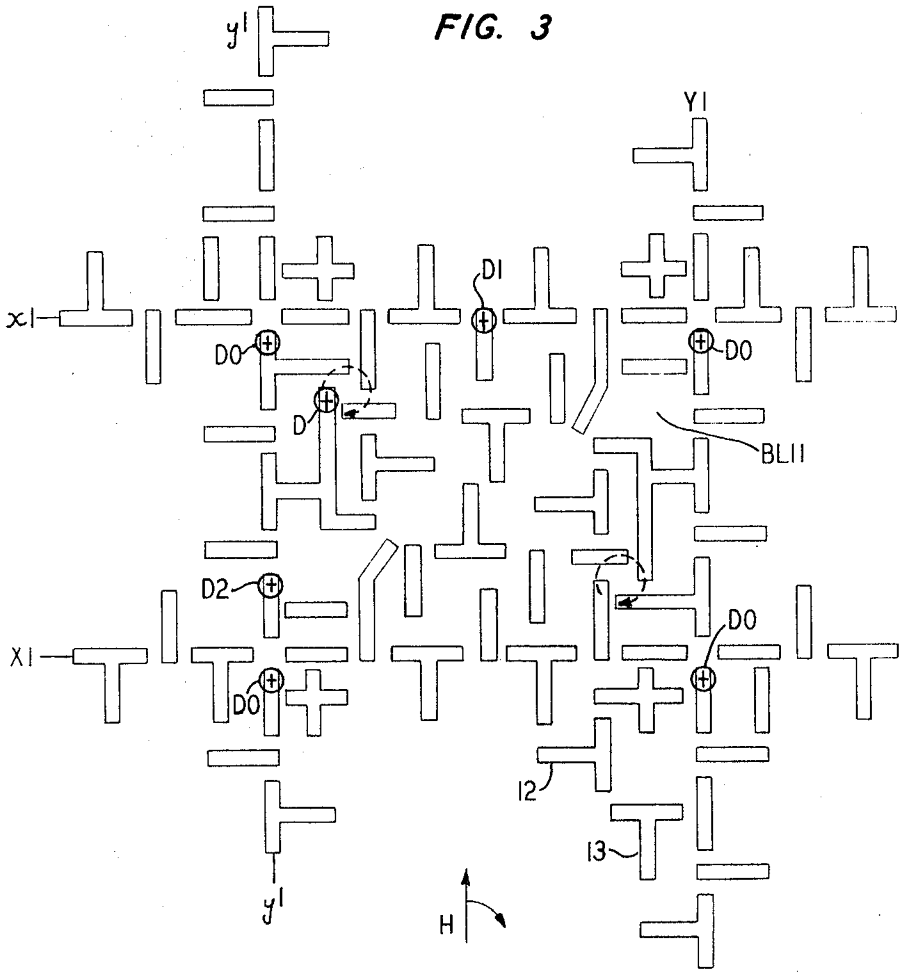
FIGS. 3—23 are top views of a representative portion of an overlay configuration for the arrangement of FIG. 1 showing consecutive magnetic conditions during operation.

FIG. 3 shows an illustrative overlay configuration for a representative bit location of FIG. 1 along with the pertinent intersecting propagation channels of FIG. 2. The illustrative overlay geometry comprises bar and T-shaped permalloy elements in patterns to move single wall domains in response to a rotating in-plane field as shown in FIG. 3. The two intersecting channels *x*1 and X1 are structured to move domains respectively from right to left and left to right as viewed as the in-plane field, represented by arrow H, rotates clockwise; channels *y*1 and Y1 are similarly structured to move domains upward and downward respectively in the illustrative embodiment.

It is helpful to bear in mind that between the intersections $x1y1$ and X1Y1, the overlay defines a pair of recirculating paths, identified by the broken curved arrows in FIG. 3, and a domain propagation shuttle path therebetween. A recirculating path is defined also at each of those intersections. The significance of the various designations and the operation of the elements so designated are most clearly understood with reference to a sequence of drawings which show consecutive dispositions for domains as the in-plane field H reorients. The sequence starts with FIG. 3 which shows, specifically, the overlay configuration for a representative bit location BL11 including the recirculating paths, the associated shuttle path, and the accessing channels.

Consider the situation where a domain D in FIG. 3 is stored (in slice 11 of FIG. 1) in the upper left recirculating position of bit location BL11 indicated by the broken curved arrow there. A domain D1 is, in addition, moving from right to left in access channel $x1$ and a domain D2 is moving simultaneously upwards in channel $y1$. The in-plane field represented by an arrow H is initially directed upward as viewed. Single wall domains DO are present permanently in the recirculating path at the intersection of coordinate accessing channels as in consistent with the teaching of copending application Ser. No. 834,350 filed June 18, 1969 for R. H. Morrow and A. J. Perneski.

Figure 4:
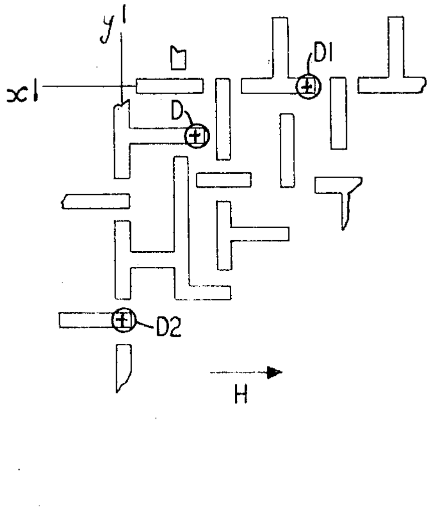
Figure 5:
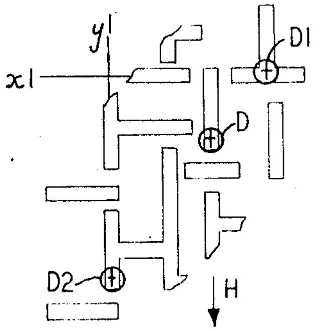

FIG. 4 shows the in-plane field directed to the right. All domains move synchronously to the positions shown. In FIG. 5, the field is directed downward. The domains once again advance as shown.

Figure 6:
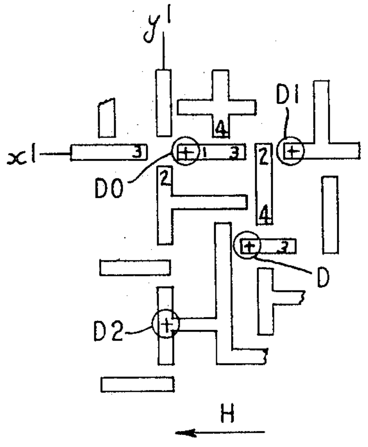

In FIG. 6, the in-plane field is directed to the left. Domain D approaches its position of FIG. 3 and in the absence of domain D1 would continue to so recirculate in response to continued rotations of the in-plane field. In this instance, however, both domains D1 and D2 are present and are approaching the intersection of coordinate paths X1 and Y1. To be more specific, FIG. 7 completes a first full cycle of the in-plane field rotation. Because of the position to which domain D1 is moved during this phase and the resulting repelling action of domain D1 on domain D, the next normal position (2 of FIG. 7) for domain D is denied to it and the domain moves to the position shown in FIG. 7 instead.

Figure 7:
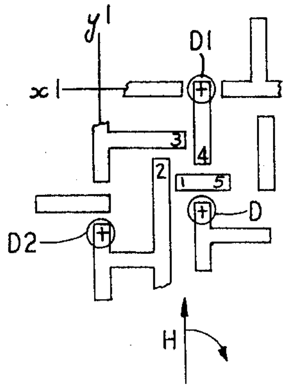
Figure 8:
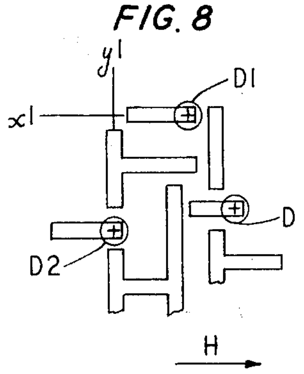

FIG. 8 shows domain D in a position (5 of FIG. 7) out of the recirculating loop of FIG. 3. The domain is constrained by the overlay configuration to move to the position shown because domain D2 is now sufficiently close to deny any alternative position to domain D by the interaction therebetween.

Figure 9:
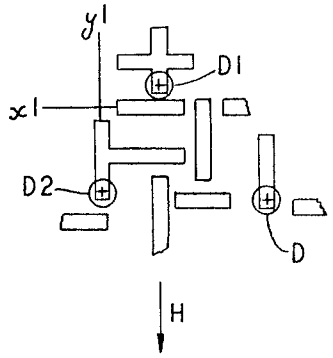

FIG. 9 shows the result of the interaction between domains D2 and whereby domain D is forced to the position shown instead of reentering the recirculation via position 4 of FIG. 7.

Figure 10:
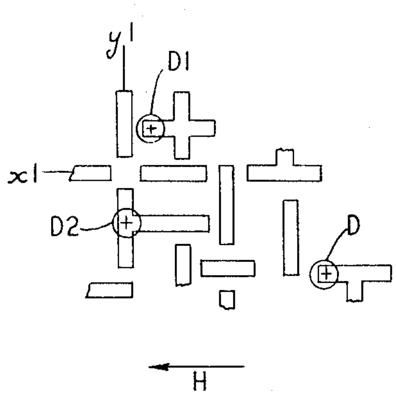
Figure 11:
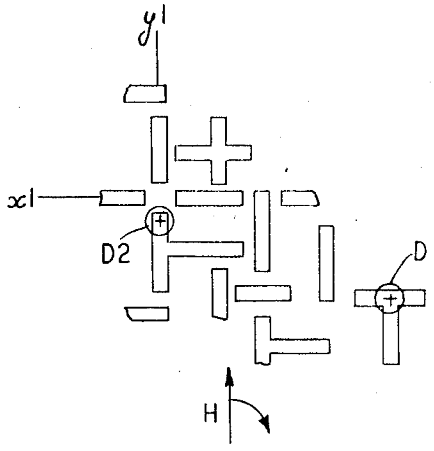
Figure 12:
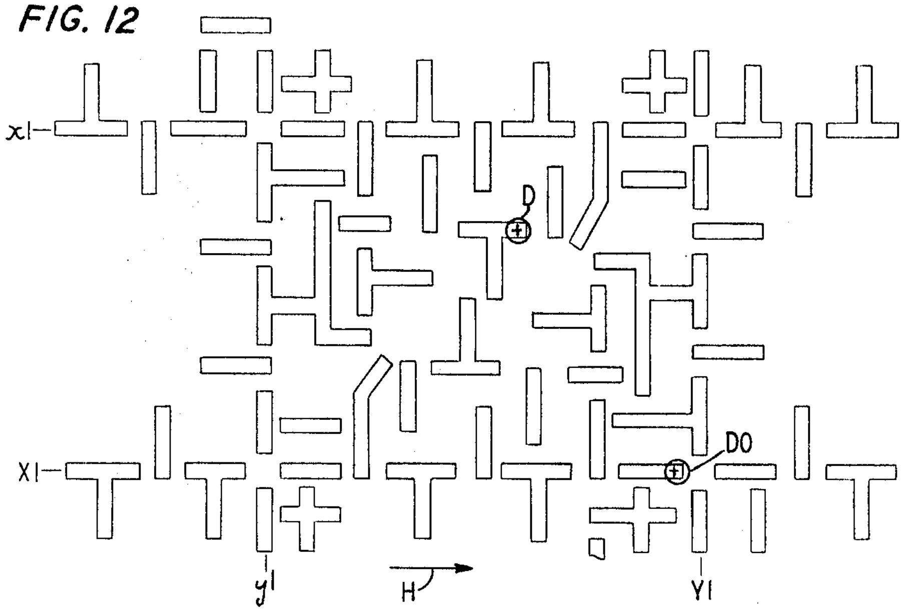
Figure 13:
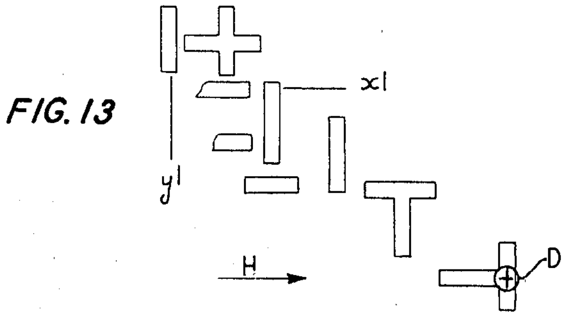
Figure 14:
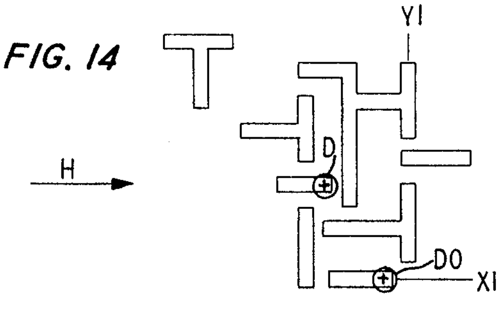

FIGS. 10, 11 and 12 show the movement of domain D along the shuttle path (shown fully in FIG. 3) toward its alternate recirculating position as the in-plane field rotates through a next cycle. FIG. 13 shows the position of the domain one complete cycle after that shown in FIG. 12. Another cycle later, domain D is in the alternate recirculating position (compare: FIG. 3), as shown in FIG. 14, where it remains during further in-plane field rotations. Domains D1 and D2 pass through the intersections as shown in the aforementioned copending application of R. H. Morrow and A. J. Perneski and are no longer to interest here. All that is important in this connection is that a domain remains at the intersection to insure operation as described.

Coincident-domain selection has now been demonstrated. For the return of a domain so selected, coincident domains are advanced along channels X1 and Y1. The operation to so return the domain is entirely analogous to the operation described as can be seen by turning FIG. 3 upside down and by recognizing the symmetry of the bit location.

The utility of any accessing scheme depends on the ability to access a selected one of an array of locations without disturbing nonselected locations. In the present arrangement, either domain D1 or D2 might cause such disturbances. We will now show that the overlay geometry employed is configured such that if only one accessing domain interacts with a recirculating domain, the latter is not deflected from its recirculating position.

Let us return to FIG. 7 which shows the normal consecutive positions for a domain in a recirculating position. The positions are designated 1, 2, 3, and 4 there, an additional position being designated 5. Domain D has been forced from the recirculating position 4 by domain D1 as was discussed above. Domain D moves from the position shown in FIG. 7 to position 5 when the in-plane field rotates to the right as already established. If domain D2 is present, domain D moves from position 5 to the position shown in FIG. 9. If domain D2 is absent, domain D moves instead to position 4 and thereafter continues to recirculate.

If domain D1 is absent, domain D never moves to the position shown for it in FIG. 7. Instead, the domain moves to position 2 in that figure and continues to recirculate in spite of the passage of domain D2. In either case, it is clear that both accessing domains are required to dislodge a selected domain. "-Half-selected" domains are only negligibly disturbed.

A domain in a first or second recirculating position of a bit location can be employed to represent a binary one or zero which can be detected by series conductor loops encompassing say first (phase) positions in sets of locations in a word-organized memory arrangement or by optical means employing the Kerr or Faraday effect. Such implementations are well known and are not shown herein.

Another method of detecting the presence of a domain in a recirculating position leads to the utilization of the arrangement of FIG. 1 as a switching array. In an embodiment of this type, a single-domain advanced along an X access channel is deflected to the coordinate Y channel if a domain is recirculating in the associated recirculating position. Of course, if a domain pattern is advanced along that X channel, the entire pattern is rerouted to the coordinate X channel providing the function of a switching matrix.

Figure 15:
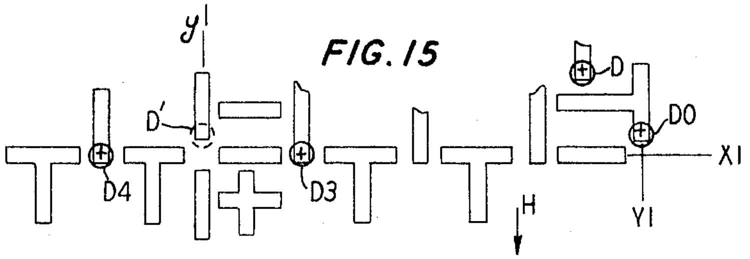

Consider a domain D in the recirculating position associated with channels X1 and Y1 as shown in FIG. 15 and consider information represented by a pattern (101) of domains moving from left to right in channel X of FIG. 15. We will now show that domain D operates to deflect the information downward along channel Y1. The information to be deflected is represented by the domains D3 and D4 (binary ones) separated by a broken circle D′ (binary zero). The positions shown are consistent for an in-plane field directed downward as indicated by arrow H in the figure.

Figure 16:
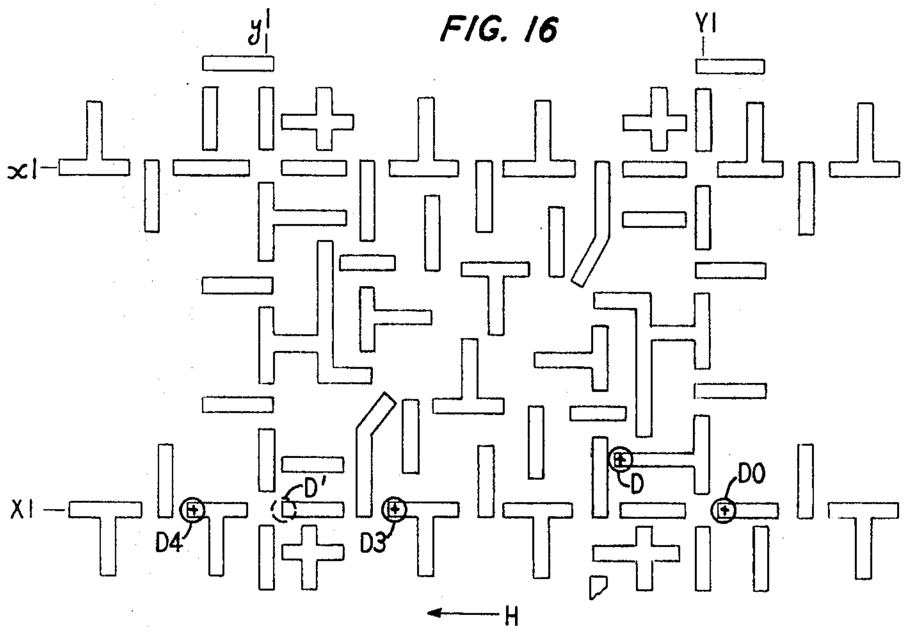
Figure 17:
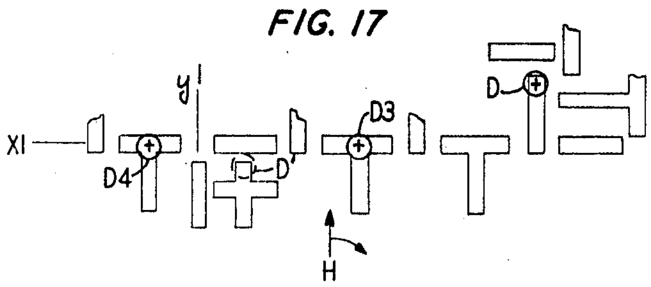

FIG. 16 shows the in-plane field directed to the left. The information moves to the right and domain D recirculates as shown. In FIG. 17, the field is directed upward and the information is advanced further to the right as shown.

Figure 18:
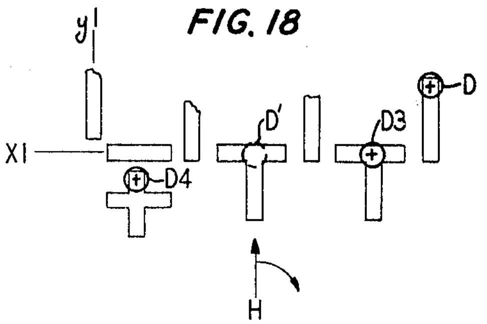
Figure 19:
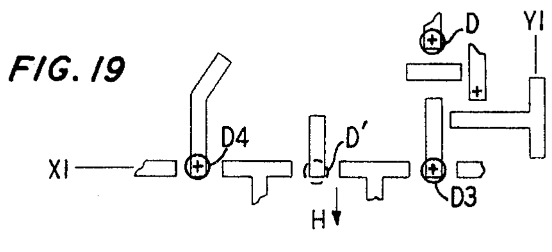

FIG. 18 shows the information disposition one full cycle later. One-half cycle after that, the field is directed downward as shown in FIG. 19, domain D is out of the recirculating channel as was the case in FIG. 7.

Figure 20:
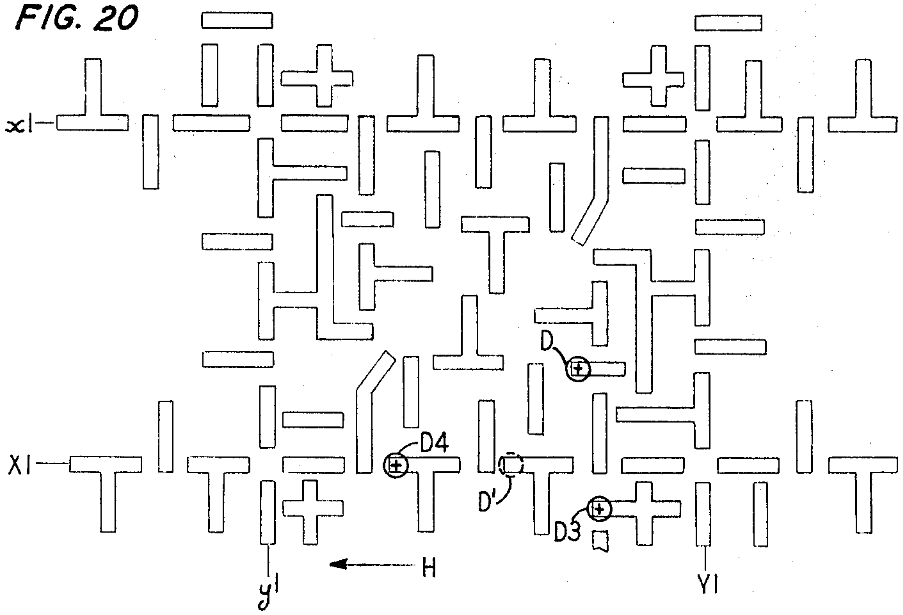
Figure 21:
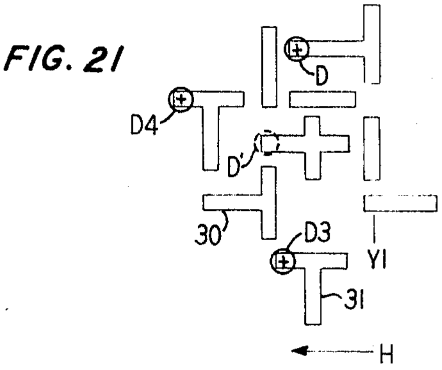

In FIG. 20, the in-plane field is directed to the left and domain D3 is deflected downward due to interaction with domain D. FIG. 21 shows the domain disposition one full cycle later. Domain D3 can be seen to be advancing downward to a position where it can enter channel Y1. In FIG. 21, domain D is in a position to deny the next normal propagation position to a domain (or absent domain) traveling along X1. In FIG. 21, domain D3 moves downward and to the right to the position shown for it there; absent domain D1 moves in an analogous fashion to the position previously occupied by domain D3.

It is important to note that T-shaped overlay elements 12 and 13 are present only in this position in the representative bit location thus violating the symmetry of the arrangement as can be seen in FIG. 3. The additional elements insure that deflection of information to a coordinate channel occurs. To be specific, these elements are missing from the $x1-y1$ intersection to avoid deflection of an accessing domain at a nonselected bit location along those accessing channels with lower case designations for example.

Figure 23:
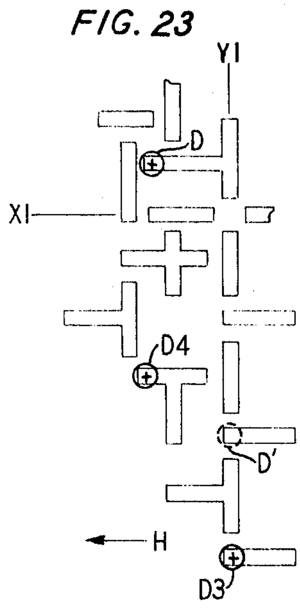
Figure 22:
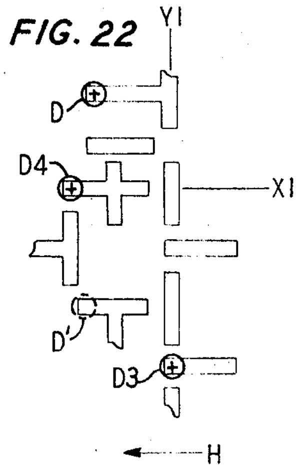

One complete cycle later, the in-plane field is again directed to the left as shown in FIG. 22 and the information pattern can be seen partially reestablished in channel Y1. When the next cycle is completed as indicated in FIG. 23, domain D4 is in a position to enter channel Y1 and the remainder of the information is moving downward in channel Y1.

Information is detected by utilization circuit 14 of FIG. 1 in a well understood manner.

We have now established the utility of the switching matrix in rerouting information represented by patterns of single wall domains and the selection of rerouting paths by coincident domain selection.

The provision of domain patterns along selected X coordinate axes and accessing domains along both X and Y axes as well as permanently in each bit location are accomplished by well understood techniques represented herein by blocks 20 and 21 of FIG. 1. An implementation adaptable to this end is disclosed in my copending application Ser. No. 756,210, filed Aug. 29, 1968. Detection circuits suitable to this end are also well known as is described in that same application. The in-plane field source is represented by block 24 in FIG. 1. A bias field for maintaining a given domain diameter may be provided by a source (not shown ) in accordance with well understood considerations.

The sources 20, 21, and 24 and circuit 14 are connected to a control circuit 23 for synchronization and activation and may be any such elements capable of operating in accordance with this invention.

The nature of an array as shown in FIG. 1 is that bit locations are disposed physically different distances from a domain source (source 21) located at the ends of accessing channels. Accordingly, source 21 may be considered to be adapted to generate the domains of an accessing domain pair of different times to permit domains to be moved as discussed in connection with FIGS. 3—23. A continuous sequence of domains may be propagated along coordinate access channels to reduce the timing requirements in this connection.

What has been described is considered only illustrative of the principles of this invention. Therefore, various and numerous other arrangements may be devised by one skilled in the art without departing from the spirit and scope of this invention.

What I claim is:

1. Apparatus including a material in a plane in which single wall domains can be moved, means comprising a magnetically soft overlay for defining first and second recirculating positions and a propagation channel therebetween for one of said domains, means for generating a reorienting in-plane field for propagating domains in said material, said overlay further defining first and second propagation channel pairs intersecting at said first and second recirculating channels respectively, and means for propagating single wall domains concurrently along said channels of said first or second pairs.

2. Apparatus in accordance with claim 1 wherein said overlay includes bar and T-shaped geometries and said in-plane field reorients by rotation.

3. Apparatus in accordance with claim 2 also including means for selectively providing a pattern of single wall domains along a selected channel of said first propagation channel pair.

4. Apparatus in accordance with claim 3 including means for selectively detecting domains in the other channel of said first propagation channel pair.

5. Apparatus comprising a material in a plane in which single wall domains can be moved, means including a magnetically soft overlay for defining alternate first and second recirculating positions for single wall domains and a propagation channel therebetween, means for generating a reorienting in-plane field for moving domains along said channel and said positions defined by said overlay, said overlay further defining first and second coordinate single wall domain propagation channel pairs intersecting at said first and second recirculating positions in a manner such that domains being advanced simultaneously along both channels of one of said pairs dislodge a domain being moved in the associated recirculating position for movement of the recirculating domain to the alternate recirculating position, and means for moving a pattern of single wall domains along one channel of a selected pair of channels to said alternate position for deflection of said pattern to the other channel of said coordinate pair.

6. Apparatus comprising a material in a plane in which single wall domains can be moved, means comprising a magnetically soft overlay pattern for defining a matrix of first and second recirculating position pairs and a propagation channel between each pair, means for generating a reorienting in-plane field for moving domains with respect to said overlay pattern, said overlay further defining for single wall domains a coordinate array of propagation channels intersecting at associated ones of said recirculating positions, means for providing a pattern of single wall domains in a selected channel of said coordinate array, and means for selectively moving single wall domains between the positions of said pairs in a manner to selectively reroute said pattern to a selected coordinate channel.

7. Apparatus in accordance with claim 6 wherein said last-mentioned means comprises means for providing a single wall domain along each of coordinate ones of said array of propagation channels for synchronous advancement to a recirculating position of one of said pairs.